US012252335B2

(12) United States Patent
Austrheim

(10) Patent No.: US 12,252,335 B2
(45) Date of Patent: Mar. 18, 2025

(54) STORAGE CONTAINER

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 123 days.

(21) Appl. No.: 17/770,851

(22) PCT Filed: Oct. 19, 2020

(86) PCT No.: PCT/EP2020/079306
§ 371 (c)(1),
(2) Date: Apr. 21, 2022

(87) PCT Pub. No.: WO2021/089305
PCT Pub. Date: May 14, 2021

(65) Prior Publication Data
US 2022/0363470 A1 Nov. 17, 2022

(30) Foreign Application Priority Data
Nov. 8, 2019 (NO) .................................. 20191329

(51) Int. Cl.
B65D 88/52 (2006.01)
B65D 6/24 (2006.01)
F16B 5/00 (2006.01)

(52) U.S. Cl.
CPC ........ *B65D 88/528* (2013.01); *B65D 11/1873* (2013.01); *F16B 5/0052* (2013.01)

(58) Field of Classification Search
CPC .... B65D 88/528; B65D 11/1873; B65D 9/34; B65D 9/12; B65D 90/08;
(Continued)

(56) References Cited

U.S. PATENT DOCUMENTS 2,691,242 A * 10/1954 Young .................. A63H 33/082
446/124
4,960,223 A 10/1990 Chiang et al.
(Continued)

FOREIGN PATENT DOCUMENTS

| CN | 203819198 A1 | 9/2014 |
| CN | 204750818 U | 11/2015 |

(Continued)

OTHER PUBLICATIONS

International Search Report issued in PCT/EP2020/079306 on Feb. 12, 2021 (5 pages).
(Continued)

*Primary Examiner* — Don M Anderson
*Assistant Examiner* — Laura E. Parker
(74) *Attorney, Agent, or Firm* — Baker Botts L.L.P.

(57) ABSTRACT

A set of moulded panels, which can be assembled together to form a storage container for an automated storage and retrieval system, includes a rectangular base panel and four side panels. The base panel is moulded with a perimeter profile. Each of the side panels is moulded with a lower edge profile. The lower edge profiles of each side panel are slidingly engaged with the perimeter profile during assembly of the storage container. Each of the side panels are moulded with side edge profiles, which are to be slidingly engaged with the side edge profiles of adjacent side panels during assembly of the storage container.

13 Claims, 10 Drawing Sheets

(58) Field of Classification Search
CPC ........... B65D 2519/00547; B65D 2519/00641; B65D 88/526; F16B 5/0052; F16B 5/0016; F16B 5/0012
USPC ............ 220/4.32, 4.28, 4.31, 682, 690, 691; 206/503, 600
See application file for complete search history.

(56) References Cited

U.S. PATENT DOCUMENTS

| | | | |
|---|---|---|---|
| 5,012,943 A * | 5/1991 | King | B65D 11/1873 220/4.32 |
| 5,058,746 A * | 10/1991 | Morgan, IV | B65D 19/18 220/4.32 |
| 5,207,343 A * | 5/1993 | Bogadi | B65D 21/083 220/4.28 |
| 5,597,084 A | 1/1997 | Parasin | |
| 8,794,464 B2 * | 8/2014 | Yamauchi | B65D 11/1873 220/325 |
| 2004/0178197 A1* | 9/2004 | Hsu | B65D 11/1833 220/7 |
| 2012/0223072 A1* | 9/2012 | Yamauchi | B65D 11/1873 220/4.01 |
| 2016/0009445 A1 | 1/2016 | Birchmeier | |
| 2016/0101897 A1 | 4/2016 | Allen et al. | |

FOREIGN PATENT DOCUMENTS

| | | | | |
|---|---|---|---|---|
| DE | 19627583 | A1 | 1/1998 | |
| DE | 202015101847 | U1 | 7/2015 | |
| EP | 0727359 | A1 | 8/1996 | |
| EP | 2604541 | A1 * | 6/2013 | ......... B65D 11/1873 |
| GB | 729062 | A * | 5/1955 | |
| GB | 2314554 | A | 1/1998 | |
| WO | 2014/075937 | A1 | 5/2014 | |
| WO | 2014/090684 | A1 | 6/2014 | |
| WO | 2015/193278 | A1 | 12/2015 | |
| WO | 2018/146304 | A1 | 8/2018 | |

OTHER PUBLICATIONS

Written Opinion of the International Searching Authority issued in PCT/EP2020/079306 on Feb. 12, 2021 (10 pages).
Norwegian Search Report issued in No. 20191329 mailed on Jun. 8, 2020 (2 pages).
Office Action issued in Chinese Application No. 202080077522.5; Dated Feb. 3, 2024 (16 pages).
Anonymous, The State Intellectual Property Office of People's Republic of China, "The Third Office Action" in application 202080077522.5, published in Beijing, People's Republic of China, Nov. 9, 2024, 7 pages (in Chinese).
Anonymous, The State Intellectual Property Office of People's Republic of China, "The Third Office Action" in application 202080077522.5, published in Beijing, People's Republic of China, Nov. 9, 2024, 11 pages (in English).
Anonymous, The State Intellectual Property Office of People's Republic of China, "The Second Office Action" in application 202080077522.5, published in Beijing, People's Republic of China, Jul. 4, 2024, 7 pages (in Chinese).
Anonymous, The State Intellectual Property Office of People's Republic of China, "The Second Office Action" in application 202080077522.5, published in Beijing, People's Republic of China, Jul. 4, 2024, 8 pages (in English).
Anonymous, The State Intellectual Property Office of People's Republic of China, "Supplementary Search Report for Third Office Action" in application 202080077522.5, published in Beijing, People's Republic of China, Nov. 9, 2024, 2 pages (in Chinese but cited references identified using Arabic reference numerals).
Anonymous, The State Intellectual Property Office of People's Republic of China, "Supplementary Search Report for Third Office Action" in application 202080077522.5, published in Beijing, People's Republic of China, Jul. 4, 2024, 2 pages (in Chinese but cited references identified using Arabic reference numerals).

* cited by examiner

STORAGE CONTAINER

TECHNICAL FIELD

The present invention relates to a set of moulded panels which can be assembled together to form a storage container for an automated storage and retrieval system. The present invention also relates to an assembled storage container for an automated storage and retrieval system. The present invention also relates to a method for assembling a storage container for an automated storage and retrieval system.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of set wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 is shown in FIG. 3 and is indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid is referred to as a storage cell. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves into which the wheels of the vehicles are inserted. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

The above storage containers occupy a relative large volume during transportation from its manufacturing site to the site of the automated storage and retrieval system. One object of the invention is to provide more efficient transportation of storage containers.

One solution to this problem known from US 2016/009445. Here, wall elements of the container are hinged to the floor element, thereby providing a foldable storage container. One object of the invention is to provide an alternative to this solution.

When all storage containers in the system are of the same type, the worst position for a storage container to be in is the lowermost storage container in a full stack.

The storage container should be sufficiently robust so that the storage container does not collapse when being in this worst position.

SUMMARY OF THE INVENTION

The present invention is set forth and characterized in the independent claims, while the dependent claims describe other characteristics of the invention.

The present invention relates to a set of moulded panels which can be assembled together to form a storage container for an automated storage and retrieval system, the set of panels comprising a rectangular base panel and four side panels, wherein:

the base panel is moulded with a perimeter profile;

each of the side panels is moulded with a lower edge profile;

the lower edge profiles of each side panel is slidingly engaged with the perimeter profile during assembly of the storage container; and each of the side panels is moulded with side edge profiles to be slidingly engaged with the side edge profiles of adjacent side panels during assembly of the storage container.

The rectangular base panel defines a base plane, and each side panel defines respective side planes. Each side panel is configured to slide into engagement with the base panel in a direction perpendicular to the base plane.

In one aspect, the perimeter profile and the lower edge profiles are shaped to transmit load carried by the base panel into the side panels when the perimeter profile and the lower edge profiles are engaged with each other.

In one aspect, the perimeter profile comprises a number of wedge-shaped profile elements and where the lower edge profiles comprise a corresponding number of complementary wedge-shaped profile elements.

In one aspect, the wedge-shaped profile elements and the complementary wedge-shaped profile elements form a dovetail-type of connection between the base panel and the respective side panels.

In one aspect, the complementary wedge-shaped profile elements of the lower edge profiles of the side panels are wider in a direction along the lower edge than the wedge-shaped profile elements of the perimeter profile.

In one aspect, the base panel comprises a storage area, where the perimeter profile forms a protrusion in a horizontal direction outside of the storage section.

In one aspect, the perimeter profile forms a continuous protrusion along the circumference of the storage area.

Alternatively, the wedge-shaped profile elements of the perimeter profile are forming spaced apart protrusions along the circumference of the storage area.

In one aspect, the lower edge profiles are slidingly engaged and interlocked with the perimeter profile during assembly of the storage container.

In one aspect, the side edge profiles are shaped to maintain the position of the respective side panels in relation to adjacent side panels.

In one aspect, the edge profiles of the first and second side panels comprises protruding elements and where the edge profiles of the third and fourth side panels comprises apertures, and where the protruding elements are adapted for insertion into respective apertures during assembly of the storage container.

In one aspect, the edge profiles are slidingly engaged and interlocked with the side edge profiles of adjacent side panels during assembly of the storage container.

In one aspect, the protruding elements are shaped to prevent separation of the protruding elements from the apertures.

The protruding elements may be deflectable fingers comprising a latch, shaped to be easy to insert into respective apertures and then latched to the apertures to prevent unintentional separation. It is then necessary to apply a force onto the deflectable fingers to move the latch and hence separate the fingers from the apertures again to separate the wall panels from each other.

In one aspect, the edge profiles are interlocked with the side edge profiles of adjacent side panels by means of additional fasteners provided through openings in the respective side panels.

In one aspect, the fasteners are inserted from one side of a side panel into an abutting side panel where the side panels overlap in order to stabilize the formation of a lower corner to upper corner edge in the assembled storage container.

In one aspect, the additional interlocking devices may comprise screws, locking pins, rivets etc.

In one aspect, the external surface of each side panel is provided with an array of moulded ribs.

In one aspect, load carried by the base panel is transferred into the side panels and further to the top of the side panels with the help of the array of moulded ribs.

In one aspect, the lowermost apertures of the third and fourth side panels and the lowermost protruding elements of the first and second side panels are located vertically between two horizontal ribs.

In one aspect, the assembled container may comprise an upper vehicle connection interface for allowing a container handling vehicle to connect to the storage container and hence elevate or lower the storage container. The upper vehicle connection interface may be provided as apertures or cut-outs in the upper area of two side panels, or in the upper area of all four side panels. The container handling vehicle is operating on a rail system of the automated storage and retrieval system.

In one aspect, the assembled storage container may comprise lower and upper stacking interfaces for allowing the storage container to be stacked in a stack together with other storage containers.

The lower and upper stacking interfaces are configured to prevent relative horizontal movement between two adjacent storage containers stacked above each other. The lower stacking interface may be provided in the base panel only, the side panels only or it may be provided as part of the base panel and the side panels.

In one aspect, the set of panels is moulded from plastics.

In one aspect, at least one wedge-shaped element of the base panel comprises a deflectable finger with a latch provided in the outer end of the deflectable finger; and where a corresponding complementary wedge-shaped profile element of at least one of the side panels comprises a cut-out adapted to receive the latch.

The present invention also relates to an assembled storage container for an automated storage and retrieval system, the storage container comprising:

a rectangular base panel with a perimeter profile;

four side panels, each of the side panels comprising a lower edge profile and side edge profiles;

wherein the lower edge profiles is slidingly engaged with the perimeter profile;

wherein each side edge profile is slidingly engaged with the side edge profiles of adjacent side panels.

The above aspects of the set of moulded panels are also aspects of the assembled storage container.

The present invention also relates to a method for assembling a storage container for an automated storage and retrieval system, where the method comprises the steps of:

providing a rectangular base panel moulded with a perimeter profile;

providing first, second, third, fourth side panels, wherein each of the side panels is moulded with a lower edge profile and wherein each of the side panels is moulded with side edge profiles;

slidingly engaging the lower edge profile of the first side panel with the perimeter profile of a first side of the rectangular base panel;

slidingly engaging the lower edge profile of the second side panel with the perimeter profile of a second side opposite of the first side of the rectangular base panel;

slidingly engaging the lower edge profile of the third side panel with the perimeter profile of a third side of the rectangular base panel, and at the same time slidingly engaging the side edge profiles of the third side panel with the adjacent side edge profiles of the first and second side panels;

slidingly engaging the lower edge profile of the fourth side panel with the perimeter profile of a fourth side of the rectangular base panel opposite of the third side, and at the same time slidingly engaging the side edge profiles of the fourth side panel with the adjacent side edge profiles of the first and second side panels.

In one aspect, the rectangular base panel defines a base plane, and wherein the step of engaging the lower edge profiles and side edge profiles comprises the step of:

slidingly engaging the lower edge profiles and side edge profiles in directions perpendicular to the base plane.

In one aspect, the method further comprises the step of:

interlocking the edge profiles with the side edge profiles of adjacent side panels by means of additional fasteners provided through openings in the respective side panels.

According to the above, the collapsible storage container can be made from three different types of panels and manufacturing costs can be reduced. The panels can be packed efficiently on a pallet or in a pallet container.

According to the above, a storage container which is easy and efficient to assemble is provided. A robot or other type of machine may easily be used to assemble the storage containers from the set of panels.

According to the above, the dimensions of the assembled storage container will not deviate from other assembled containers, or the deviations will be very small and neglectable. It is considered important to reduce such deviations as much as possible, as the storage containers are stacked above each other in the grid columns, and as they are to be lifted and transported by the container handing vehicles.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
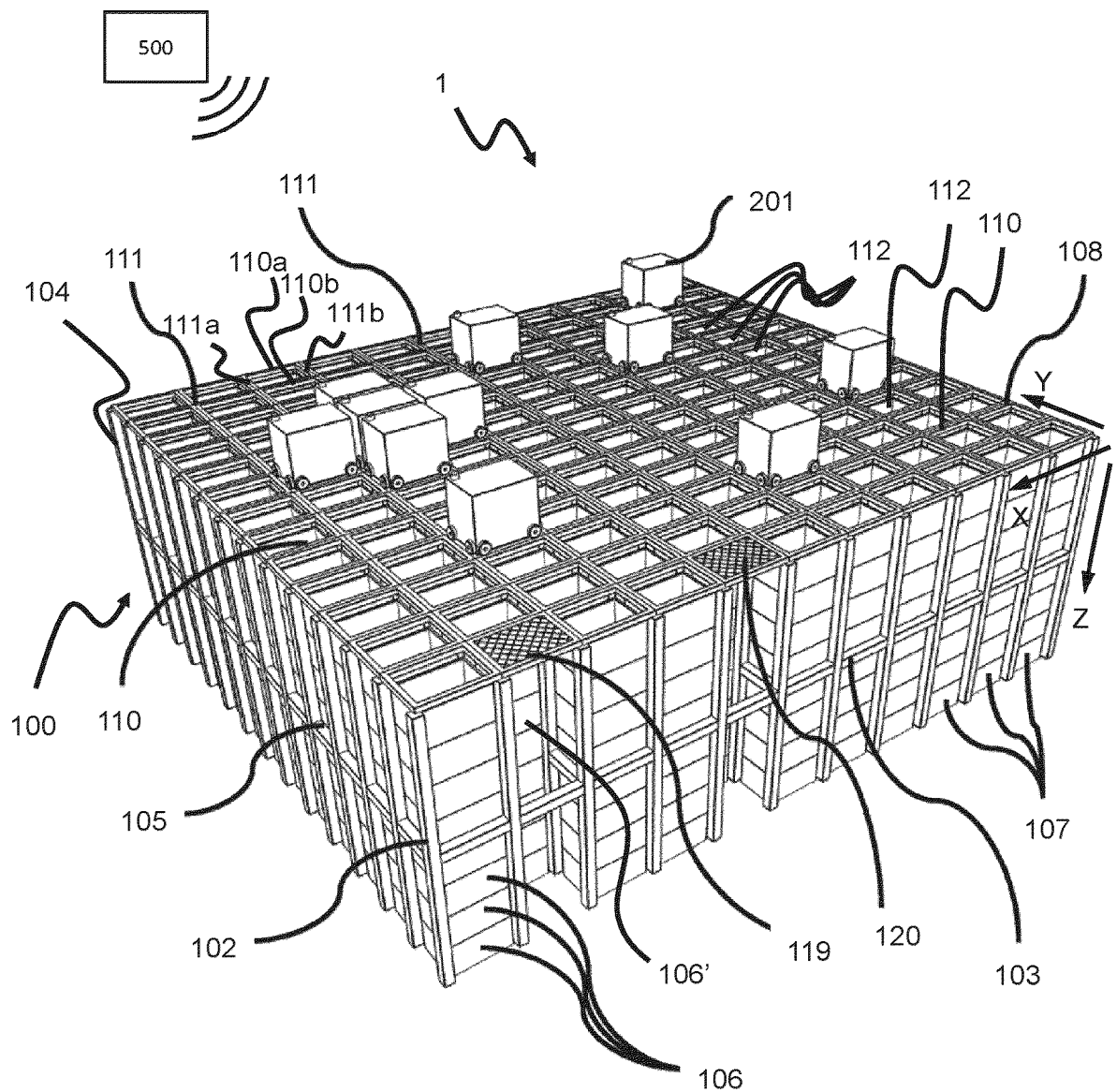
FIG. 1 is a perspective view of a framework structure of a prior art automated storage and retrieval system.
Figure 2:
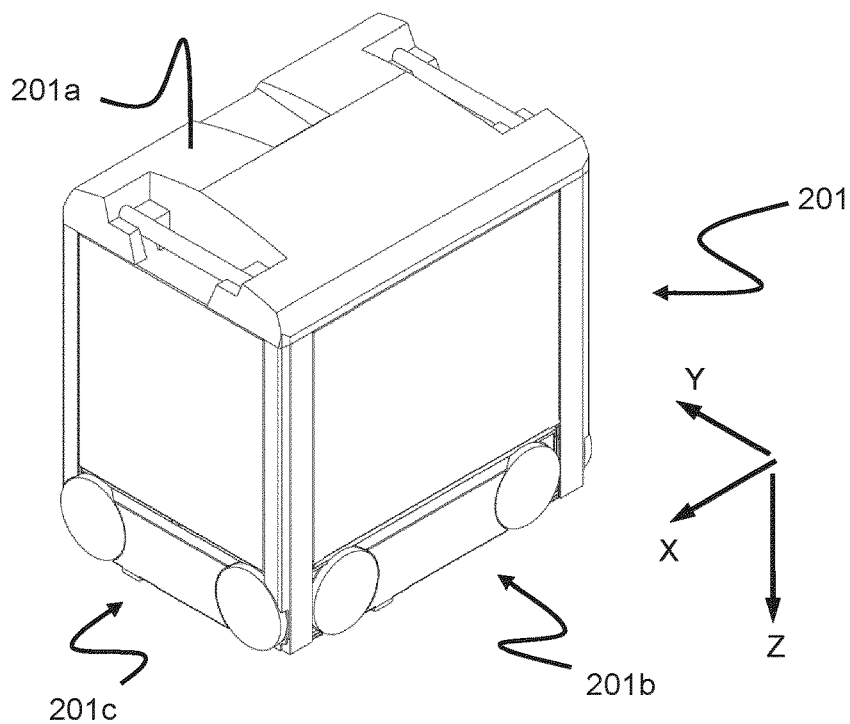
FIG. 2 is a perspective view of a prior art container handling vehicle having a centrally arranged cavity for carrying storage containers therein.
Figure 3:
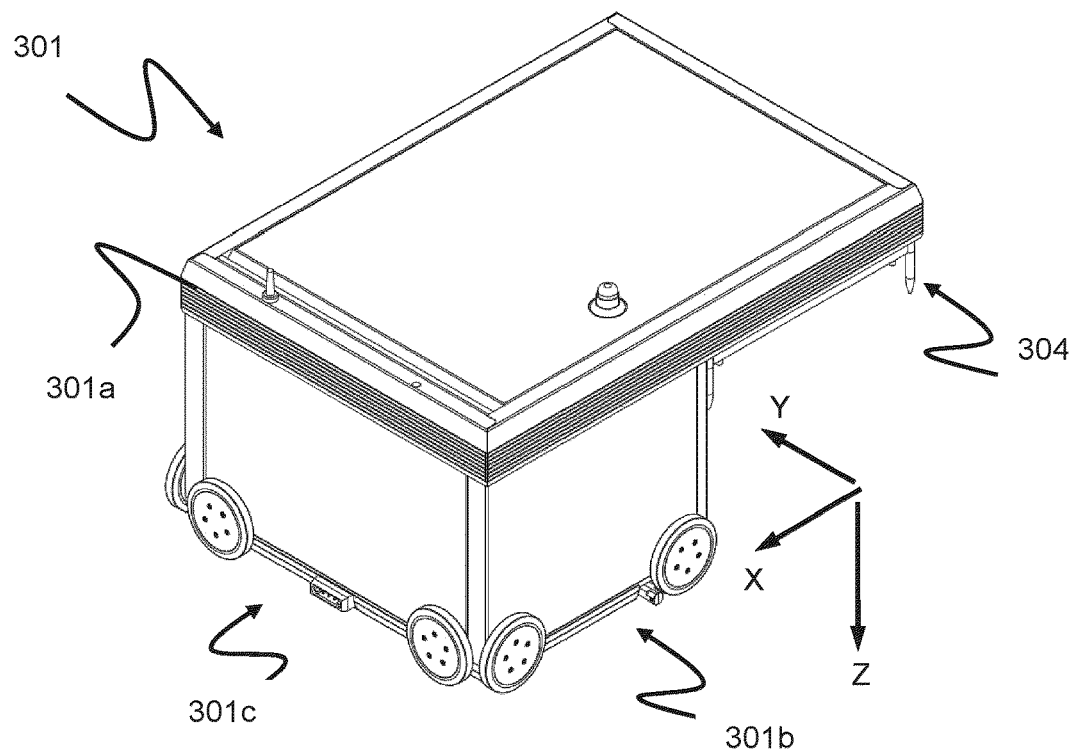
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 4:
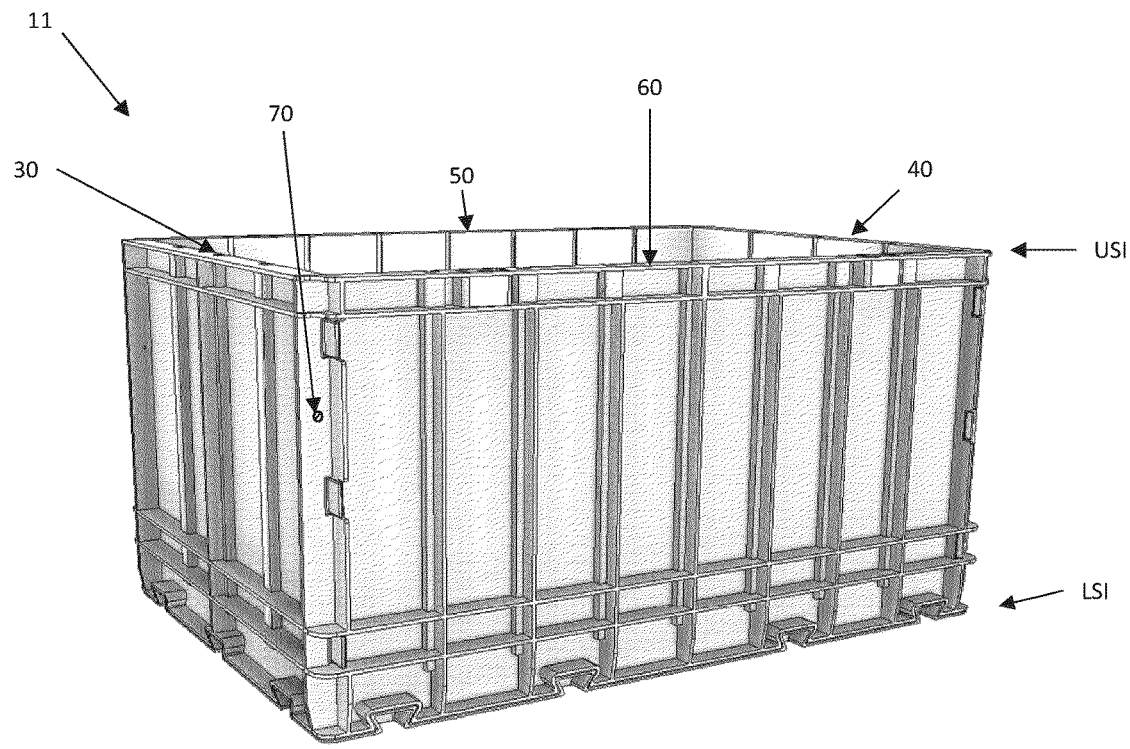
FIG. 4 is a perspective view of a first embodiment of an assembled storage container.
Figure 5:
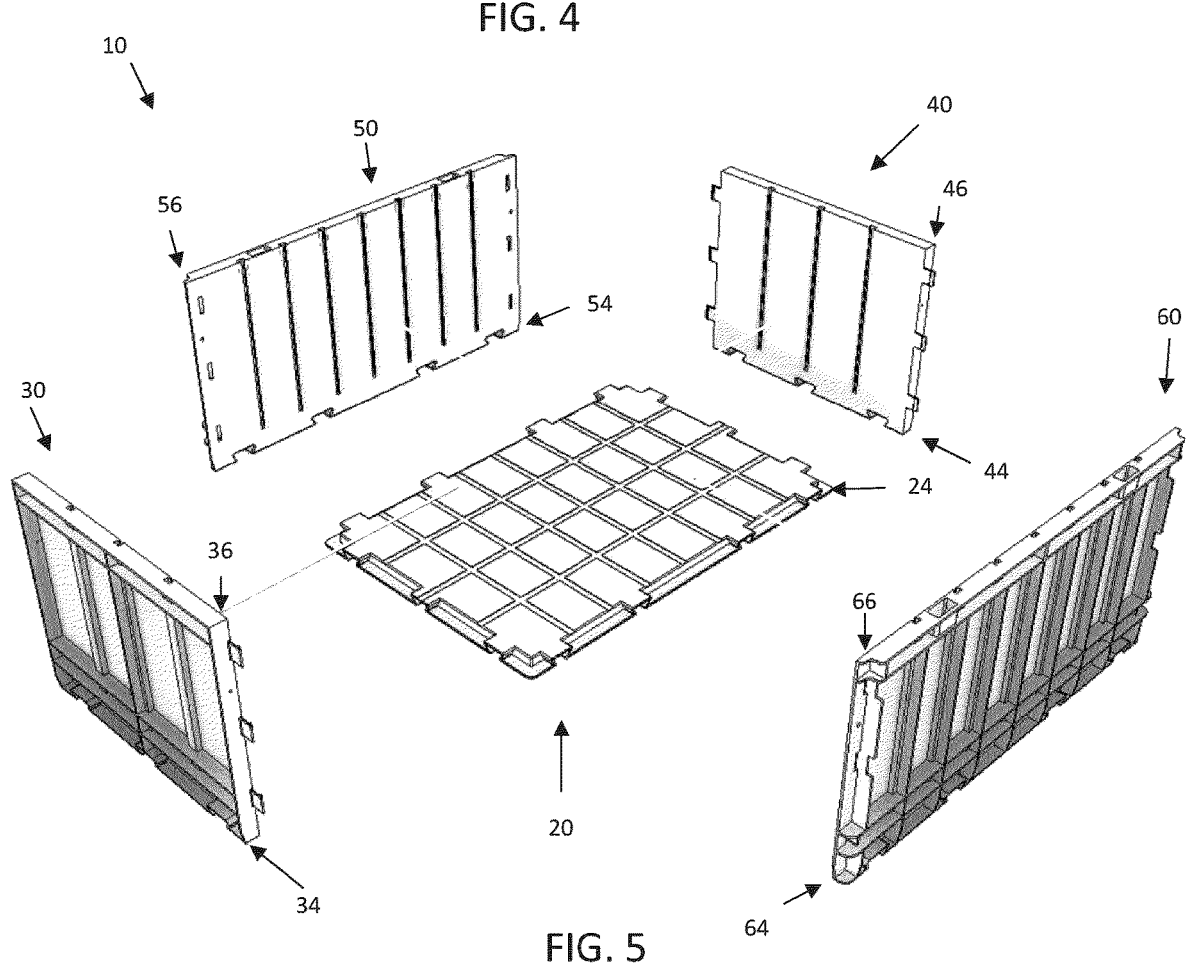
FIG. 5 is a perspective view of a set of panels which can be assembled into the storage container of FIG. 4.

It is now referred to FIGS. 4 and 5. Here, it is shown that a set 10 of panels 20, 30, 40, 50, 60 (FIG. 7) can be assembled into a storage container 11 for use in the above automated storage and retrieval system 1.

The set 10 of panels comprises a rectangular base panel 20 and four side panels 30, 40, 50, 60. The panels are manufactured by means of a moulding process, preferably a plastic moulding process. In a preferred embodiment, the first and second side panels 30, 40 are identical to each other, while the third and fourth side panels 50, 60 are identical to each other. In this way, the manufacturing costs can be reduced.

The term "panel" refers herein to a substantially flat and rectangular or square object, as will be apparent from the description below.

Base Panel 20

The base panel 20 will now be described with reference to FIG. 6. The base panel 20 forms the bottom of the assembled storage container 11, onto which product items are placed. A storage area 21 of the base panel 20 is indicated as a dashed rectangle in FIG. 6, where this storage area 21 corresponds to the area of the base panel being visible when viewing the assembled storage container 11 from above. The rectangular base panel 21 defines a base plane, and each side panel defines respective side planes. When the storage container 11 is stacked in a stack 107 of storage containers, the base plane will typically correspond to the horizontal plane, while the side panels are perpendicular to the horizontal plane.

The base panel 20 comprises a perimeter profile 24 along the circumference of the storage area 21. The perimeter profile 24 is in the present embodiment not visible when viewing the assembled storage container 11 from above, as the perimeter profile 24 is hidden below and/or within the side panels.

The perimeter profile 24 forms a protrusion in a direction A parallel to the base plane away from the storage area 21. It should be noted that in FIG. 6, as the base panel is rectangular and hence has four sides, the perimeter profile 24 protrudes from the storage area 21 in four directions all indicated as arrows A.

This perimeter profile 24 is used to connect the base panel 20 to the side panels 30, 40, 50, 60, i.e. to transmit load carried by the base panel 20 into the side panels 30, 40, 50, 60. In the present embodiment, this is achieved by the perimeter profile 24 comprising a number of wedge-shaped profile elements 25.

In the present embodiment, the perimeter profile 24 forms a continuous protrusion along the circumference of the storage area 21. Here, the perimeter profile 25 comprises a substantially planar profile element 28 between each of the wedge-shaped profile elements 25.

However, it is also possible that the perimeter profile 24 is arranged as a plurality of spaced apart protrusions along the circumference of the storage area 21, i.e. the perimeter profile 24 is discontinuous. In this alternative, the wedge-shaped profile elements 25 of the perimeter profile 24 are forming spaced apart protrusions along the circumference of the storage area 21, and there are no planar profile elements 28 or the planar profile elements 28 are shorter than in FIG. 6.

Figure 6:
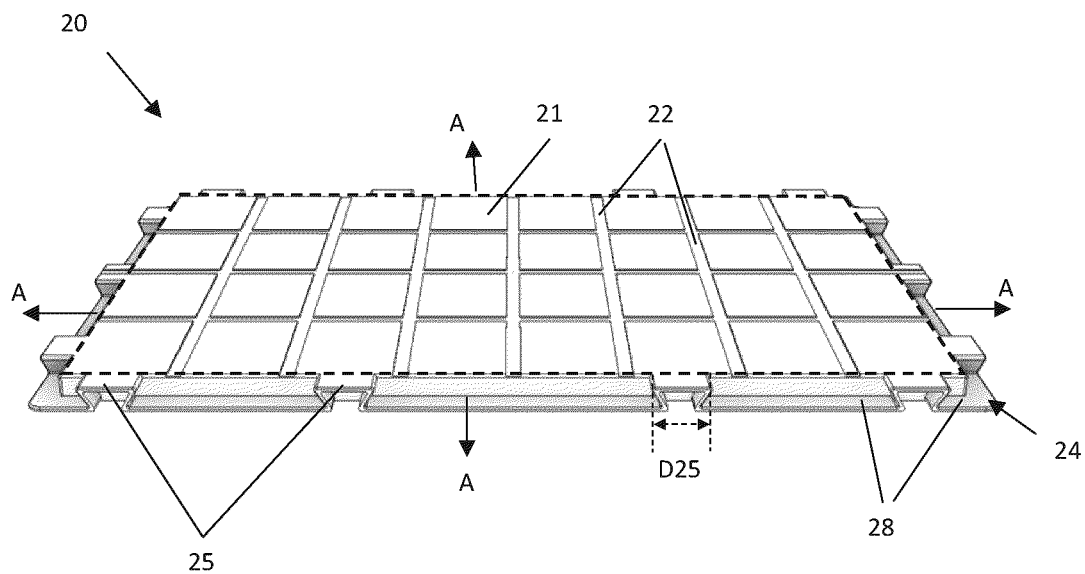
FIG. 6 illustrates a base panel.

The width of each wedge-shaped profile element 25 is indicated as D25 in FIG. 6.

The base panel 20 further comprises ribs 22 to reinforce the base panel 20.

First Side Panel 30

Figure 7:
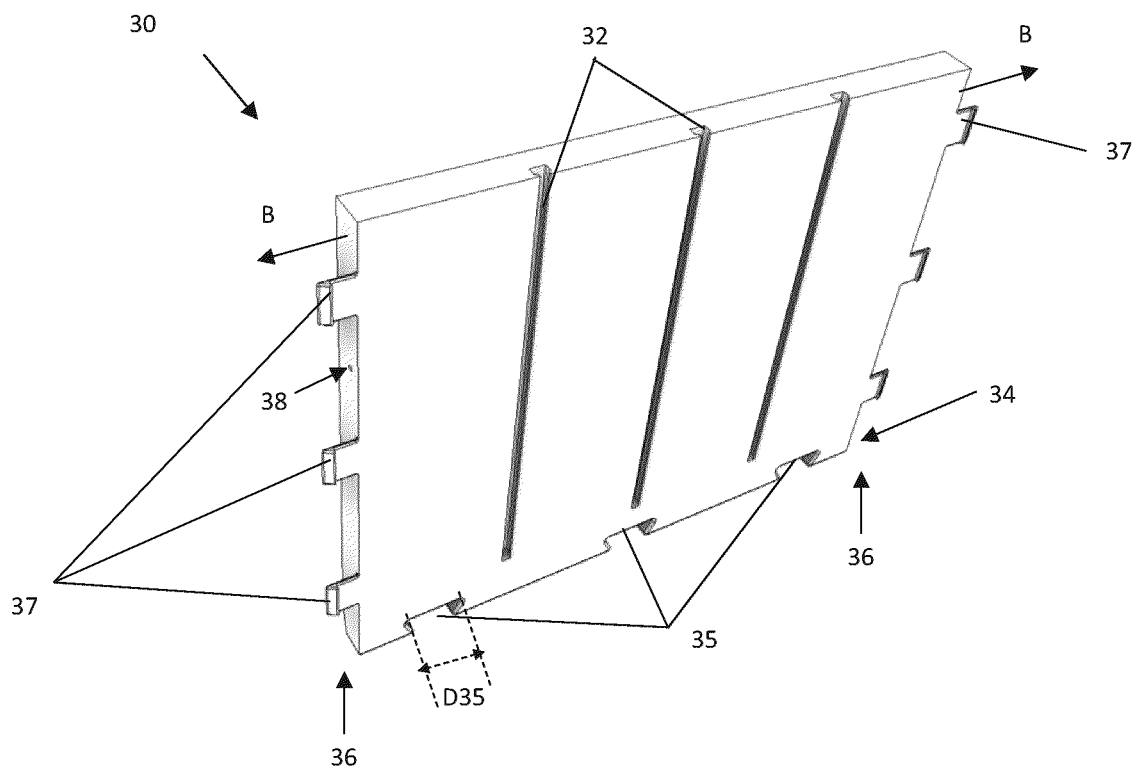
FIG. 7 illustrates a first side panel.

The first side panel 30 will now be described with reference to FIG. 7. The first side panel 30 may be substantially rectangular or substantially square. The first side panel 30 comprises a lower edge profile 34 and two side edge profiles 36.

The lower edge profile 34 has a shape adapted to the perimeter profile 24 of a first side of the base panel 20. In the present embodiment, the lower edge profile 34 comprises a number of complementary wedge-shaped profile elements 35. The width of each wedge-shaped profile element 35 is indicated as D35 in FIG. 7. The width D35 is substantially similar to, but slightly larger than, the width D25, enabling the wedge-shaped profile elements 25 of the first side of the base panel 20 to be inserted into the complementary wedge-shaped profile elements 35 of the first side panel 30 and hence form a dovetail joint.

The two side edge profiles 36 comprise elements 37 protruding in a direction B parallel with the side plane of the first side panel 30. In FIG. 7 it is shown that each side edge profile 36 comprises three such protruding elements 37 in the form of deflectable fingers comprising a latch, shaped to be easy to insert into an aperture then latched to this aperture to prevent unintentional separation again. These apertures will be described further in detail below.

Figure 14A:
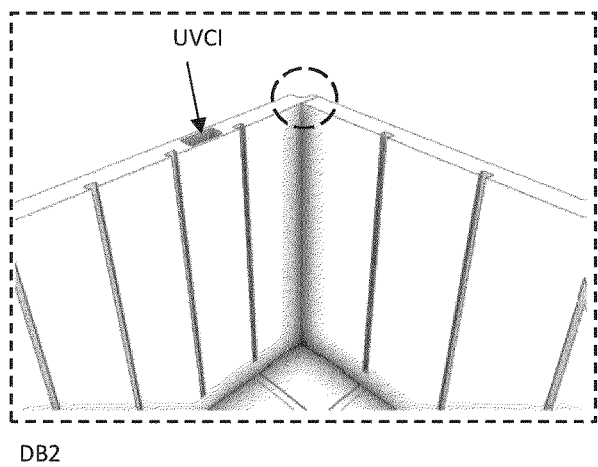
FIG. 14*a* illustrates an enlarged view of the area marked with a dashed box DB2 in FIG. 13.
Figure 14B:
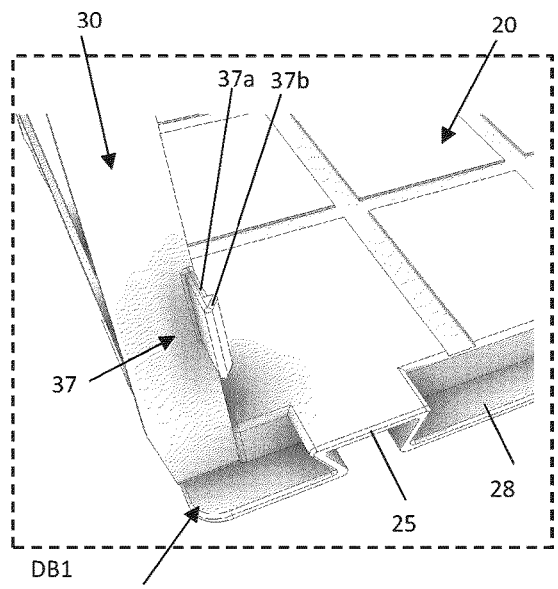
FIG. 14*b* illustrates an enlarged view of the are marked with a dashed box DB1 in FIG. 12.

It is now referred to FIG. 14b. Here, an enlarged view of the protruding element 37 is shown, where the deflectable finger is indicated as 37a and the latch provided in the outer end of the deflectable finger 37a is indicated as 37b.

The first side panel 30 further comprises ribs 32 to reinforce the side panel 30.

The side edge profiles 36 further comprises openings 38 adapted to receive a fastener, which will be described further in detail below.

Second Side Panel 40

Figure 8:
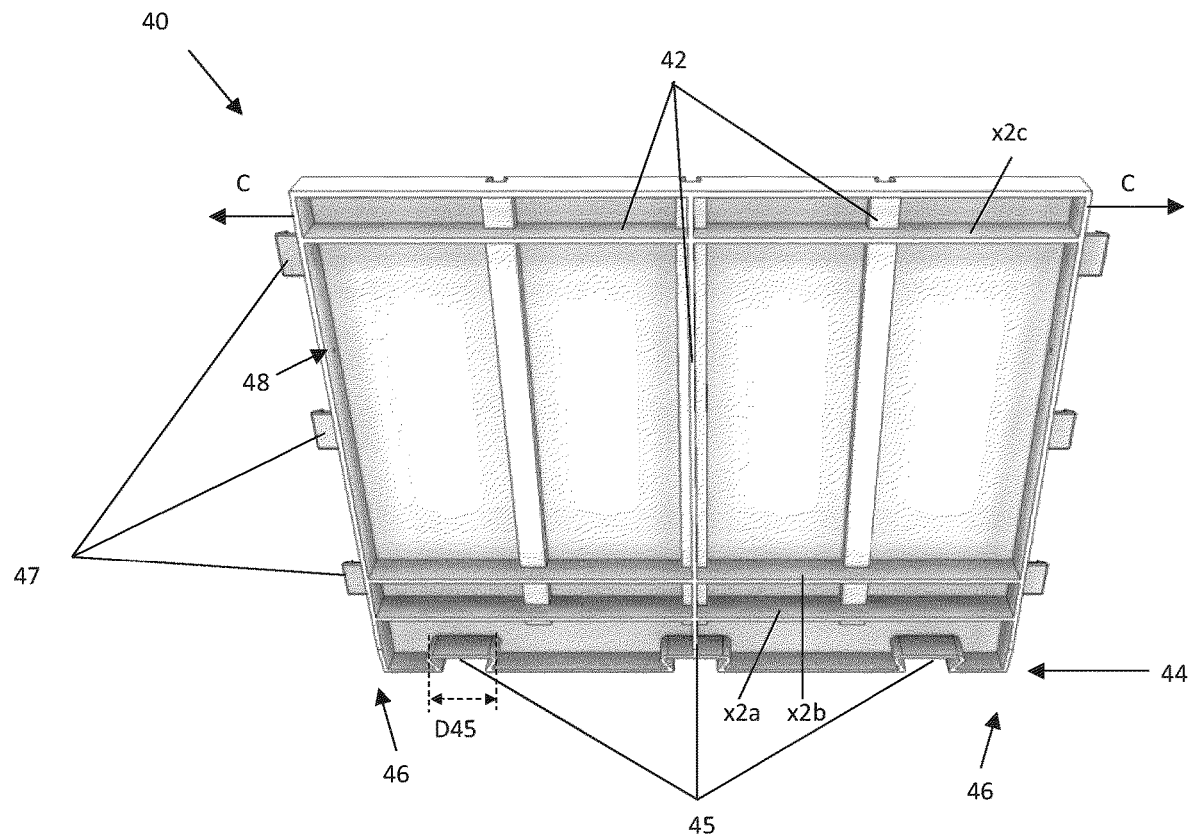
FIG. 8 illustrates a second side panel.

The second side panel 40 will now be described with reference to FIG. 8. In the present embodiment, the second side panel 40 is identical to the first side panel 30. While FIG. 7 shows the side of the side panel facing inwardly into the interior of the container, FIG. 8 shows the outwardly facing side of the side panel.

The second side panel 40 comprises a lower edge profile 44 and two side edge profiles 46.

The lower edge profile 44 has a shape adapted to the perimeter profile 24 of a second side of the base panel 20. In the present embodiment, the lower edge profile 44 comprises a number of complementary wedge-shaped profile elements 45 identical to those of the first side panel.

The two side edge profiles 46 comprises elements 47 protruding in a direction C parallel with the side plane of the second side panel 40. The protruding elements 47 are of the same type as of the first side panel 30.

Similar to the first side panel 30, the second side panel 40 further comprises ribs 42 and the side edge profiles 46 further comprises openings 48 adapted to receive a fastener, which will be described further in detail below.

Third Side Panel 50

Figure 9:
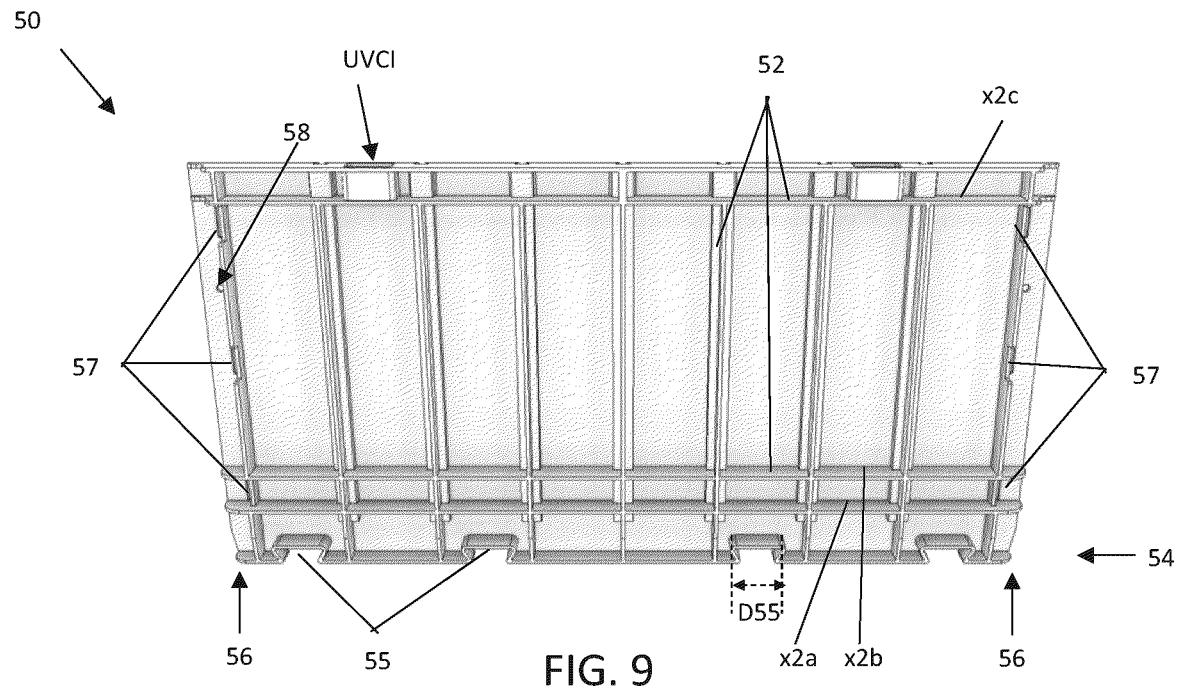
FIG. 9 illustrates a third side panel.

The third side panel 50 will now be described with reference to FIG. 9. The third side panel 50 may be substantially rectangular or substantially square. The first side panel 50 comprises a lower edge profile 54 and two side edge profiles 56.

The lower edge profile 54 has a shape adapted to the perimeter profile 24 of a third side of the base panel 20. In the present embodiment, the lower edge profile 54 comprises a number of complementary wedge-shaped profile elements 55. The width of each wedge-shaped profile element 55 is indicated as D55 in FIG. 7. The width D55 is substantially similar to, but slightly larger than the width D25, enabling the wedge-shaped profile elements 25 of the third side of the base panel 20 to be inserted into the complementary wedge-shaped profile elements 55 of the third side panel 50 and hence form a dovetail joint.

The two side edge profiles 56 comprises apertures 57 perpendicular to the side plane of the third side panel 50. In FIG. 9 it is shown that each side edge profile 56 comprises three such apertures 57 adapted to receive the respective deflectable fingers of the first and second side panels 30, 40.

The third side panel 50 further comprises ribs 52 to reinforce the side panel 50.

The side edge profiles 56 further comprises openings 58 adapted to receive a fastener, which will be described further in detail below. The openings 58 is aligned with openings 38, 48 of the first and second side panels.

The third side panel 50 further comprises parts of an upper vehicle connection interface UVCI, in the form of a cut-out or an aperture into which a gripping device 304 of a container handling vehicle 201, 301 can be engaged.

Fourth Side Panel 60

Figure 10:
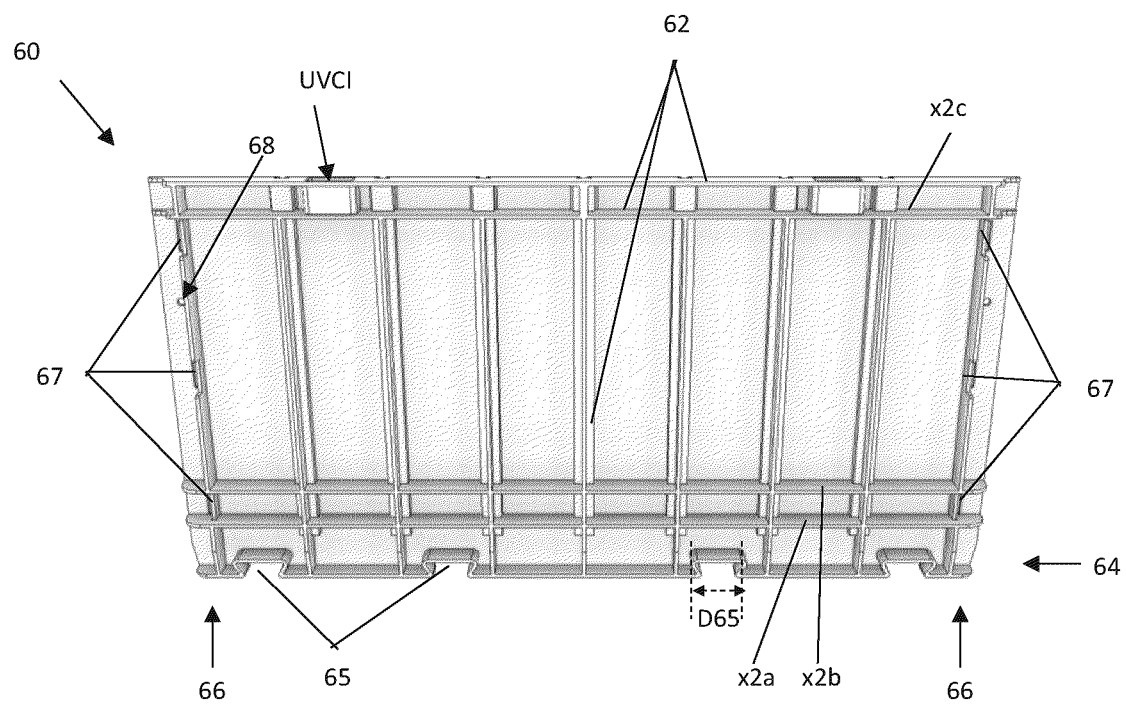
FIG. 10 illustrates a fourth side panel.

The fourth side panel 60 will now be described with reference to FIG. 10. In the present embodiment, the fourth side panel 60 is identical to the third side panel 50.

Similar to the third side panel, the fourth side panel 60 comprises a lower edge profile 64 and two side edge profiles 66.

The lower edge profile 64 has a shape adapted to the perimeter profile 24 of a fourth side of the base panel 20. In the present embodiment, the lower edge profile 64 comprises a number of complementary wedge-shaped profile elements 65. The width of each wedge-shaped profile element 65 is indicated as D65 in FIG. 7. The width D65 is substantially similar to, but slightly larger than the width D25, enabling the wedge-shaped profile elements 25 of the fourth side of the base panel 20 to be inserted into the complementary wedge-shaped profile elements 65 of the fourth side panel 60 and hence form a dovetail joint.

The two side edge profiles 66 comprises apertures 67 perpendicular to the side plane of the fourth side panel 60. In FIG. 10 it is shown that each side edge profile 66 comprises three such apertures 67 adapted to receive the respective deflectable fingers of the first and second side panels 30, 40.

The fourth side panel 60 further comprises ribs 62 to reinforce the side panel 60.

The side edge profiles 66 further comprises openings 68 adapted to receive a fastener, which will be described further in detail below. The openings 68 is aligned with openings 38, 48 of the first and second side panels.

The fourth side panel 60 further comprises other parts of the upper vehicle connection interface UVCI, in the form of a cut-out or an aperture into which a gripping device 304 of a container handling vehicle 201, 301 can be engaged.

Assembly of the Storage Container

The assembly of the set 10 of panels 20, 30, 40, 50, 60 into an assembled storage container 11 will now be described with reference to FIGS. 11-13.

Figure 11:
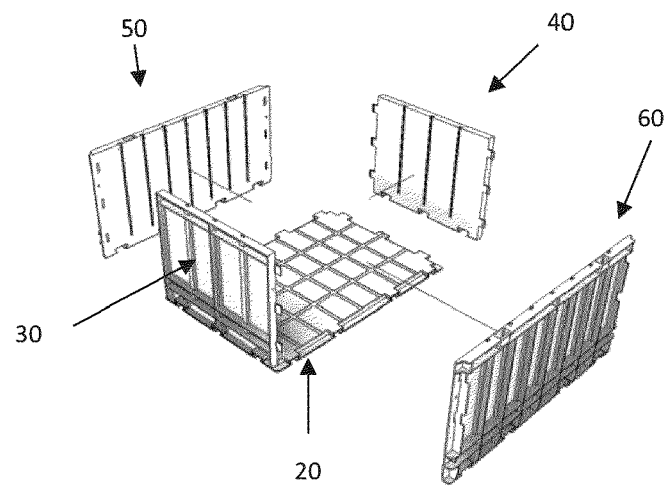
FIG. 11-13 illustrates the steps of assembling the storage container from the set of panels.

In a first step shown in FIG. 11, the lower edge profile 34 of the first side panel 30 is slidingly engaged with the perimeter profile 24 of a first side of the rectangular base panel 20.

Figure 12:
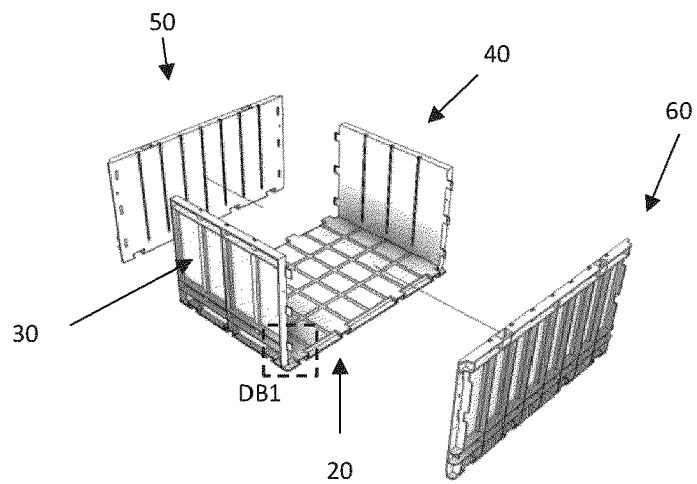

In a next step shown in FIG. 12, which could be performed at the same time as the step of FIG. 11, the lower edge profile 44 of the second side panel 40 is slidingly engaged with the perimeter profile 24 of a second side opposite of the first side of the rectangular base panel 20.

Figure 13:
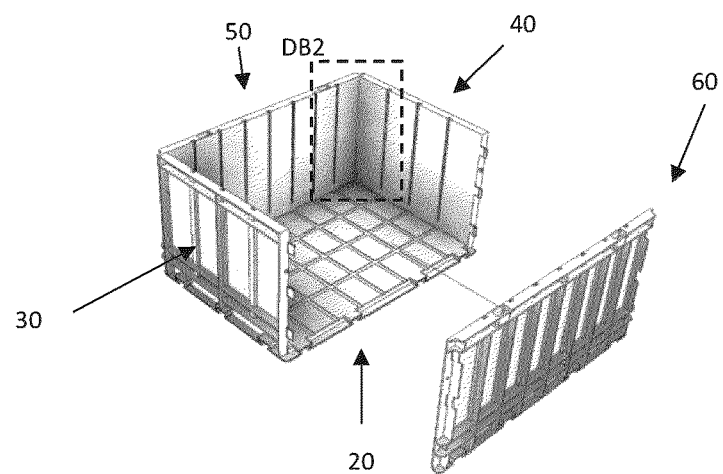

In a next step shown in FIG. 13, the lower edge profile 54 of the third side panel 50 is slidingly engaged with the perimeter profile 24 of a third side of the rectangular base panel 20. Here, also the side edge profiles 56 of the third side panel 50 is slidingly engaged with the adjacent side edge profiles 36, 46 of the first and second side panels 30, 40.

In a next step, shown for example in FIG. 4, which could be performed at the same time as in FIG. 13, the lower edge profile 64 of the fourth side panel 60 is slidingly engaged with the perimeter profile 24 of a fourth side of the rectangular base panel 20 opposite of the third side. Here, the side edge profiles 66 of the fourth side panel 60 are also slidingly engaged with the adjacent side edge profiles 36, 46 of the first and second side panels 30, 40.

Each of the above side panels are configured to slide into engagement with the base panel in a direction perpendicular to the base plane.

In the drawings, the first side panel 30 is adjacent to both the third and the fourth side panels 50, 60, as the first side edge profile 36 of the first side panel 30 is connected to the first side edge profile 56 of the third side panel 50 and the second side edge profile 36 of the first side panel 30 is connected to the first side edge profile 66 of the fourth side panel 60. In the same way, the second side panel 40 is adjacent to both the third and the fourth side panels 50, 60, as the first side edge profile 46 of the second side panel 40 is connected to the second side edge profile 56 of the third side panel 50 and the second side edge profile 46 of the second side panel 40 is connected to the second side edge profile 66 of the fourth side panel 60.

Accordingly, the first and second side panels are not adjacent to each other, and the third and fourth side panels are not adjacent to each other. As all side panels are engaged with the base panel, the base panel is considered to be adjacent to all side panels.

After the above steps, the storage container 11 has been assembled. It should be noted that in the above embodiment, the dovetail joints between the base panel and the respective side panels do not have latches etc. which prevents separation of lower edge profiles of the side panels from the perimeter profile of the base panel. Such latches could be provided in an alternative embodiment. However, it is considered sufficient that the side edge profiles of the side panels are latched to the respective side edge profiles of adjacent side panes to prevent unintentional separation.

In the present embodiment, the edge profiles 36, 46, 56, 66 of the side panels are further connected to side edge profiles 36, 46, 56, 66 of adjacent side panels by means of additional fasteners 70 (FIG. 4) provided through openings 38, 48, 58, 68 in the respective side panels 30, 40, 50, 60. The fasteners 70 may comprise screws, locking pins, rivets etc. As shown in the drawings, the fasteners 70 may be inserted from one side of a side panel into an abutting side panel where the side panels overlap in order to stabilize the formation of a lower corner to upper corner edge in the assembled storage container. This overlap is indicated within the dashed circle of FIG. 14*a*.

To improve robustness and rigidity of the assembled storage container 11, the lowermost apertures 57, 67 of the third and fourth side panels and the lowermost protruding elements 37, 47 of the first and second side panels are located vertically between two horizontal ribs x2*a*, x2*b* (shown in FIG. 8, 9, 10). In addition, a horizontal rib x2*c* is located vertically above the upper aperture 57, 67 of the third and fourth side panels and vertically above the upper protruding element 37, 47 of the first and second side panels 30, 40.

It should be noted that the perimeter profile 24 and the lower edge profiles 34, 44, 54, 64 are shaped to transmit load carried by the base panel 20 into the side panels 30, 40, 50, 60 when the perimeter profile 24 and the lower edge profiles 34, 44, 54, 64 are engaged with each other. Moreover, the load carried by the base panel is transferred into the side panels and further to the top of the side panels with the help of the array of moulded ribs 32, 42, 52, 62 (including ribs x2*a*, x2*b*, x2*c*). This is important for these types of storage containers, as they are lifted from above via their upper vehicle connection interface UVCI.

The assembled storage container 11 may further comprise lower and upper stacking interfaces LSI, USI for allowing the storage container 11 to be stacked in a stack 107 together with other storage containers (indicated by arrows in FIG. 4). The lower and upper stacking interfaces LSI, USI are configured to prevent relative horizontal movement between two adjacent storage containers stacked above each other. The lower stacking interface LSI may be provided in the base panel 20 only, the side panels only or it may be provided as part of the base panel and the side panels.

Figure 15A:
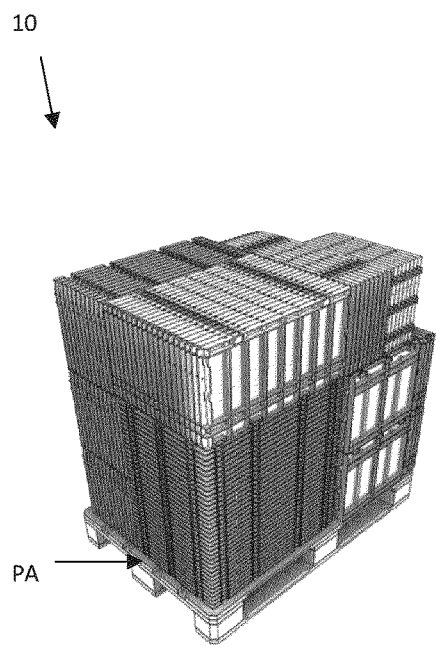
FIGS. 15A and 15B illustrates how sets of panels may be transported.
Figure 15B:
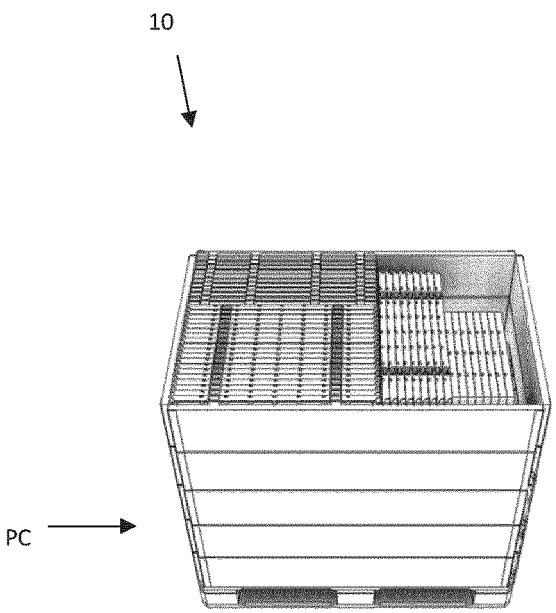

FIG. 15A shows how the sets 10 of panels 20, 30, 40, 50, 60 may be stacked efficiently on a pallet PA for example during transportation from a manufacturing site to the site of the automated storage and retrieval system. FIG. 15B shows how sets 10 of panels 20, 30, 40, 50, 60 may be stacked efficiently within a pallet container PC.

Alternative Embodiments

It is now referred to FIGS. 16a-16d, where alternative embodiments of assembled storage containers 11 are shown. The storage containers 11 are assembled from a set 10 of panels 20, 30, 40, 50, 60 in the same way as the above embodiments.

Figure 16A:
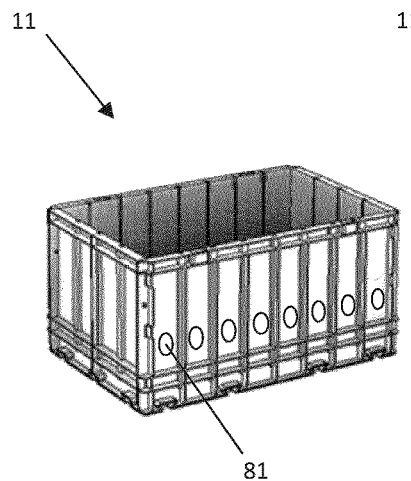
FIG. 16*a-d* illustrate alternative embodiments of the storage container.

In FIG. 16a, apertures 81 are provided in two of the side panels of the storage container 11. The apertures 81 are used for ventilation purposes, for cooling purposes etc. by allowing air (or gas) with desired properties to enter the storage containers.

Figure 16B:
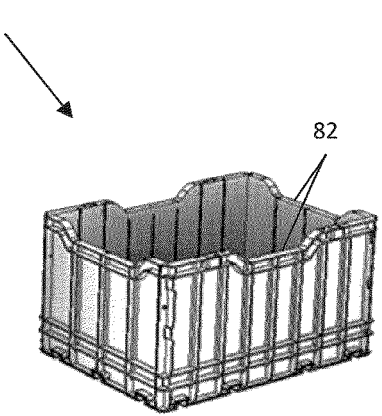

In FIG. 16b, recesses 82 are provided in the upper parts of the side panels, for example for the same purpose as the apertures 81.

Figure 16C:
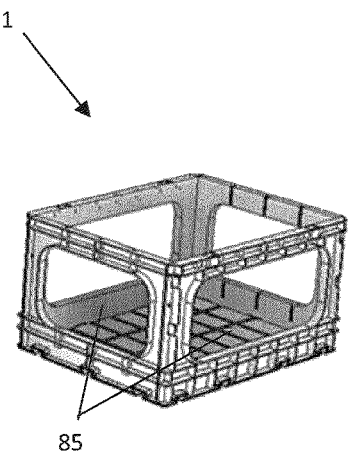

In FIG. 16c, one large aperture 85 is provided in each side panel, for example for the same purpose as the apertures 81.

Figure 16D:
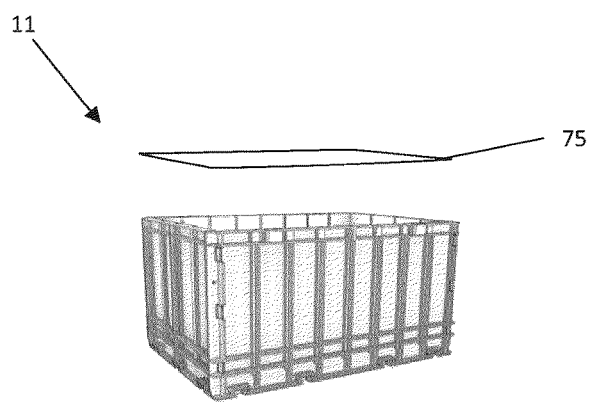

In FIG. 16d, the storage container 11 comprises a top frame 75 for connection to the upper parts of the side panels 30, 40, 50, 60. The top frame 75 may ensure that the side panels are held in the same position with respect to each other.

Figure 17A:
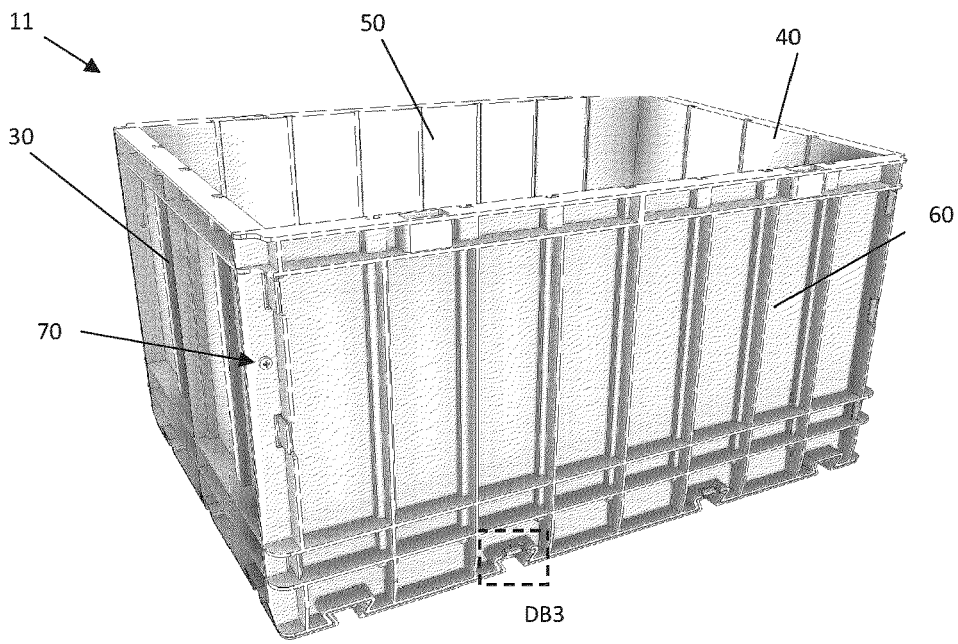
FIG. 17*a-d* shows yet an alternative embodiment of the storage container.

It is now referred to FIG. 17a-d. FIG. 17a shows an assembled container 11. It should be noted that only differences between this embodiment and the embodiments described above will be described in detail here.

Figure 17B:
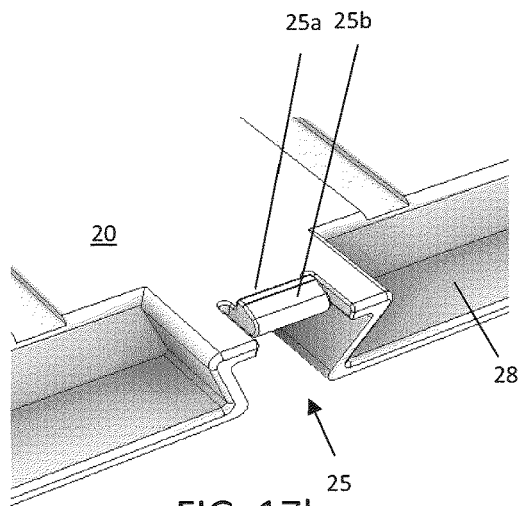

In FIG. 17b, a detail of one of the wedge-shaped elements 25 of the base panel 20 is shown to comprise a deflectable finger indicated as 25a with a latch 25b provided in the outer end of the deflectable finger 25a.

Figure 17C:
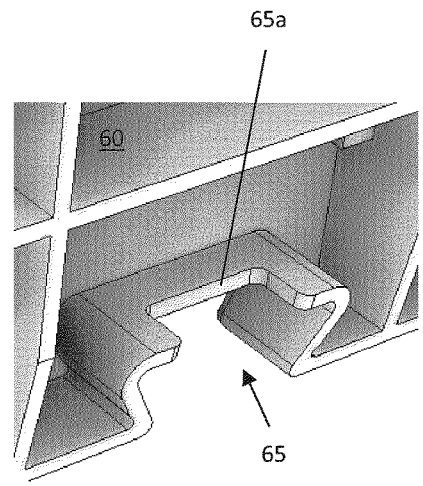

In FIG. 17c, a detail of one of the complementary wedge-shaped profile elements 65 of the fourth side panel 60 is shown to comprise a cut-out 65a adapted to receive the latch 25b.

Figure 17D:
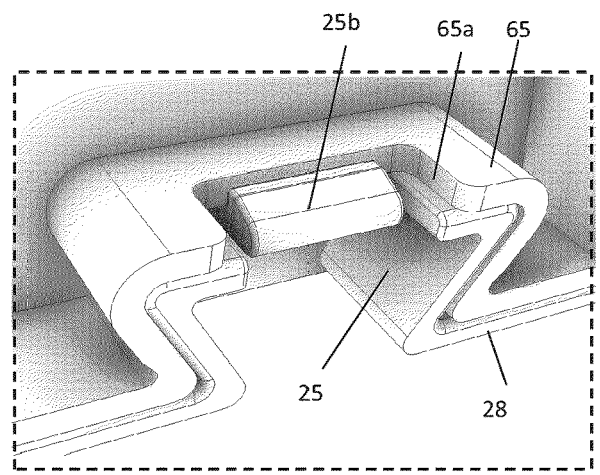

In FIG. 17d, an enlarged view of the dashed box DB3 in FIG. 17a is shown. Here, the fourth side panel 60 has been assembled to the base panel 20, and it is shown that the latch 25b of the wedge-shaped element 25 has been interlocked with the cut-out 65a of the complementary wedge-shaped profile element 65.

In FIG. 17a, two of the four wedge-shaped elements 25 and two of the four complementary wedge-shaped profile elements 65 are of this interlocking type, while the other two are of the type without a deflectable finger and latch. The third side panel 50 are of the same type as the fourth side panel 60. It should be noted that none of the wedge-shaped elements 25 on the first and second side of the base panel, i.e. the wedge-shaped elements 25 adapted to be connected to the first and second side panels 30, 40 respectively, are of this interlocking type.

It should be noted that some of, or all of, the wedge-shaped elements 25 of the other sides of the base panel 20 and the complementary wedge-shaped profile elements 35, 45, 55 of the other side panels 30, 40, 50 may be of the interlocking type shown in FIG. 17b-17d. In the preceding description, various aspects of the set of panels and the storage containers according to the invention have been described with reference to the illustrative embodiments. For purposes of explanation, specific numbers, systems and configurations were set forth in order to provide a thorough understanding of the system and its workings. However, this description is not intended to be construed in a limiting sense. Various modifications and variations of the illustrative embodiments, as well as other embodiments of the system, which are apparent to persons skilled in the art to which the disclosed subject matter pertains, are deemed to lie within the scope of the present invention.

REFERENCE NUMERALS (1) automated storage and retrieval system
(10) set of panels
(11) storage container
(20) base panel
(21) storage area
(22) ribs
(24) perimeter profile
(25) wedge-shaped profile elements
(25a) deflectable finger
(25b) latch
(28) planar profile elements
(30) first side panel
(32) ribs
(34) lower edge profile
(35) complementary wedge-shaped profile elements
(36) side edge profile
(37) protruding element
(37a) deflectable finger
(37b) latch
(38) openings
(40) second side panel
(42) ribs
(44) lower edge profile
(45) complementary wedge-shaped profile elements
(46) side edge profiles
(47) protruding element
(48) openings
(50) third side panel
(52) ribs
(54) lower edge profile
(55) complementary wedge-shaped profile elements
(56) side edge profiles
(57) apertures
(58) openings
(60) fourth side panel
(62) ribs
(64) lower edge profile
(65) complementary wedge-shaped profile elements
(65a) cut-out
(66) edge profile
(67) apertures
(68) openings
(70) additional fastener
(75) top frame
(81) apertures
(82) recesses
(85) large aperture
(100) framework structure
(102) upright members
(103) horizontal members
(105) storage columns
(106) storage containers
(107) stack
(108) rail system
(110) Parallel rails in first direction (X)
(110a) First rail in first direction (X)
(110b) Second rail in first direction (X)
(111) Parallel rail in second direction (Y)
(111a) First rail of second direction (Y)
(111b) Second rail of second direction (Y)

(112) Access opening
(119) First port column
(120) Second port column
(201) Prior art storage container vehicle
(201a) Vehicle body of the storage container vehicle 101
(201b) Drive means/wheel arrangement, first direction (X)
(201c) Drive means/wheel arrangement, second direction (Y)
(301) Prior art cantilever storage container vehicle
(301a) Vehicle body of the storage container vehicle 101
(301b) Drive means in first direction (X)
(301c) Drive means in second direction (Y)
(304) gripping device
(LSI) upper stacking interfaces
(LSI) lower stacking interface
(PA) pallet
(PC) pallet container
(USI) upper stacking interface
(LSI) lower stacking interface
(UVCI) upper vehicle connection interface
(x2a, x2b, x2c) ribs
(A) horizontal direction

The invention claimed is:

1. A set of moulded panels which can be assembled together to form a storage container for an automated storage and retrieval system, the set of panels comprising a rectangular base panel and four side panels, wherein:
the base panel comprises four sides and each side is moulded with a perimeter profile comprising a number of wedge-shaped profile elements;
each of the side panels corresponds to one of the four sides of the base panel, and is moulded with a lower edge profile comprising a corresponding number of complementary wedge-shaped profile elements, wherein the wedge-shaped profile elements and the complementary wedge-shaped profile elements form a dovetail-type of connection between the base panel and the respective side panels;
the lower edge profiles of each side panel are configured to be slidingly engaged with the perimeter profile of the corresponding one of the four sides of the base panel by sliding in a respective sliding engagement direction toward the corresponding side of the base panel and parallel to a base plane of the base panel during assembly of the storage container;
wherein:
when the lower edge profiles of each side panel are configured to be slidingly engaged with the corresponding one of the four sides of the base panel, the wedge-shaped profile elements and the complementary wedge-shaped profile elements are configured to transmit load carried by the base panel into the side panels;
at least one wedge-shaped profile element of a side of the base panel comprises a first wall having a deflectable finger portion, with a latch provided in an outer end of the deflectable finger portion;
wherein at least one corresponding complementary wedge-shaped profile element of the corresponding side panel comprises a complementary wall having an inner end, and a cut-out adapted to receive the latch at an outer end, the inner end of the complementary wall being configured to deflect the deflectable portion of the first wall to permit movement of the corresponding side panel relative to the latch and toward the base panel in the sliding engagement direction, and the cut-out being adapted to allow the deflectable portion to rebound so that the latch is received by the cut-out the latch and the cut-out being configured to oppose movement of the corresponding side panel away from the side of the base panel in a direction opposite to the sliding engagement direction; and
each of the side panels are moulded with side edge profiles which are to be slidingly engaged with the side edge profiles of adjacent side panels during assembly of the storage container.

2. The set of panels according to claim 1, wherein the complementary wedge-shaped profile elements of the lower edge profiles of the side panels are wider in a direction along the lower edge than the wedge-shaped profile elements of the perimeter profile.

3. The set of panels according to claim 1, wherein the base panel comprises a storage area, and wherein the perimeter profile forms a protrusion in a horizontal direction away from the storage area.

4. The set of panels according to claim 3, wherein the protrusion formed by the perimeter profile is a continuous protrusion along the circumference of the storage area.

5. The set of panels according to claim 1, wherein the lower edge profiles are slidingly engaged and interlocked with the perimeter profile during assembly of the storage container.

6. The set of panels according to claim 1, wherein the side edge profiles are shaped to maintain a position of the respective side panels in relation to adjacent side panels.

7. The set of panels according to claim 1, wherein the edge profiles of a first side panel and a second side panel of the four side panels comprise protruding elements, wherein the edge profiles of a third side panel and a fourth side panel of the four side panels comprise apertures, and wherein the protruding elements are adapted for insertion into respective apertures during assembly of the storage container.

8. The set of panels according to claim 7, wherein the protruding elements are shaped to prevent separation of the protruding elements from the apertures.

9. The set of panels according to claim 1, wherein the edge profiles are slidingly engaged and interlocked with the side edge profiles of adjacent side panels during assembly of the storage container.

10. The set of panels according to claim 1, wherein the edge profiles are interlocked with the side edge profiles of adjacent side panels by means of additional fasteners provided through openings in the respective side panels.

11. An assembled storage container for an automated storage and retrieval system, the storage container comprising:
a rectangular base panel comprising four sides, wherein each side has a perimeter profile comprising a number of wedge-shaped profile elements;
four side panels, each of the side panels corresponds to one of the four sides of the base panel and comprises a lower edge profile comprising a corresponding number of complementary wedge-shaped profile elements, and a side edge profile;
wherein the wedge-shaped profile elements and the complementary wedge-shaped profile elements form a dovetail-type of connection between the base panel and the respective side panels;
wherein the lower edge profiles of each side panel are slidingly engaged with the perimeter profile of the corresponding one of the four sides of the base panel by sliding in a respective sliding engagement direction toward the corresponding side of the base panel;

wherein:
the wedge-shaped profile elements and the complementary wedge-shaped profile elements are configured to transmit load carried by the base panel into the side panels;
at least one wedge-shaped profile element of a side of the base panel comprises a first wall having a deflectable portion with a latch provided in an outer end of the deflectable portion;
at least one corresponding complementary wedge-shaped profile element of the corresponding side panel comprises a complementary wall having an inner end, and a cut-out at an outer end, the inner end of the complementary wall being configured to deflect the deflectable portion of the first wall to permit movement of the corresponding side panel relative to the latch and toward the base panel in the sliding engagement direction, and the cut-out being adapted to allow the deflectable portion to rebound so that the latch is received by the cut-out to oppose movement of the corresponding side panel away from the side of the base panel in a direction opposite to the sliding engagement direction; and
each side edge profile is slidingly engaged with the side edge profiles of adjacent side panels.

12. A method for assembling a storage container for an automated storage and retrieval system, wherein the method comprises:
providing a rectangular base panel comprising four sides, each side being moulded with a perimeter profile comprising a number of wedge-shaped profile elements;
providing first, second, third, fourth side panels, wherein each of the side panels corresponds to one of the four sides of the base panel, and is moulded with a lower edge profile comprising a corresponding number of complementary wedge-shaped profile elements, and wherein each of the side panels is moulded with side edge profiles;
wherein the wedge-shaped profile elements and the complementary wedge-shaped profile elements form a dovetail-type of connection between the base panel and the respective side panels;
slidingly engaging the lower edge profile of the first side panel with the perimeter profile of a first side of the rectangular base panel by sliding the first side panel in a first sliding engagement direction toward the first side of the rectangular base panel and parallel to a base plane of the base panel;
slidingly engaging the lower edge profile of the second side panel with the perimeter profile of a second side opposite of the first side of the rectangular base panel by sliding the second side panel in a second sliding engagement direction toward the second side of the rectangular base panel and parallel to the base plane of the base panel;
slidingly engaging the lower edge profile of the third side panel with the perimeter profile of a third side of the rectangular base panel by sliding the third side panel in a third sliding engagement direction toward the third side of the rectangular base panel and parallel to a base plane of the base panel, and at the same time slidingly engaging the side edge profiles of the third side panel with adjacent side edge profiles of the first and second side panels;
slidingly engaging the lower edge profile of the fourth side panel with the perimeter profile of a fourth side of the rectangular base panel opposite of the third side by sliding the fourth side panel in a fourth sliding engagement direction toward the fourth side of the rectangular base panel and parallel to a base plane of the base panel, and at the same time slidingly engaging the side edge profiles of the fourth side panel with the adjacent side edge profiles of the first and second side panels;
wherein:
when the lower edge profiles of each side panel are slidingly engaged with the corresponding one of the four sides of the base panel, the wedge-shaped profile elements and the complementary wedge-shaped profile elements are configured to transmit load carried by the base panel into the side panels;
at least one wedge-shaped profile element of a side of the base panel comprises a first wall having a deflectable portion with a latch provided in an outer end of the deflectable portion;
and at least one corresponding complementary wedge-shaped profile element of the corresponding side panel comprises a complementary wall having an inner end, and a cut-out at an outer end, the inner end of the complementary wall being configured to deflect the deflectable portion of the first wall to permit movement of the corresponding side panel relative to the latch and toward the base panel in the respective sliding engagement direction, and the cut-out being adapted to allow the deflectable portion to rebound so that the latch is received by the cut-out to oppose movement of the corresponding side panel away from the side of the base panel in a direction opposite to the respective sliding engagement direction.

13. The method according to claim 12, further comprising:
interlocking the edge profiles with the side edge profiles of adjacent side panels by means of additional fasteners provided through openings in the respective side panels.

* * * * *